Figure 1:
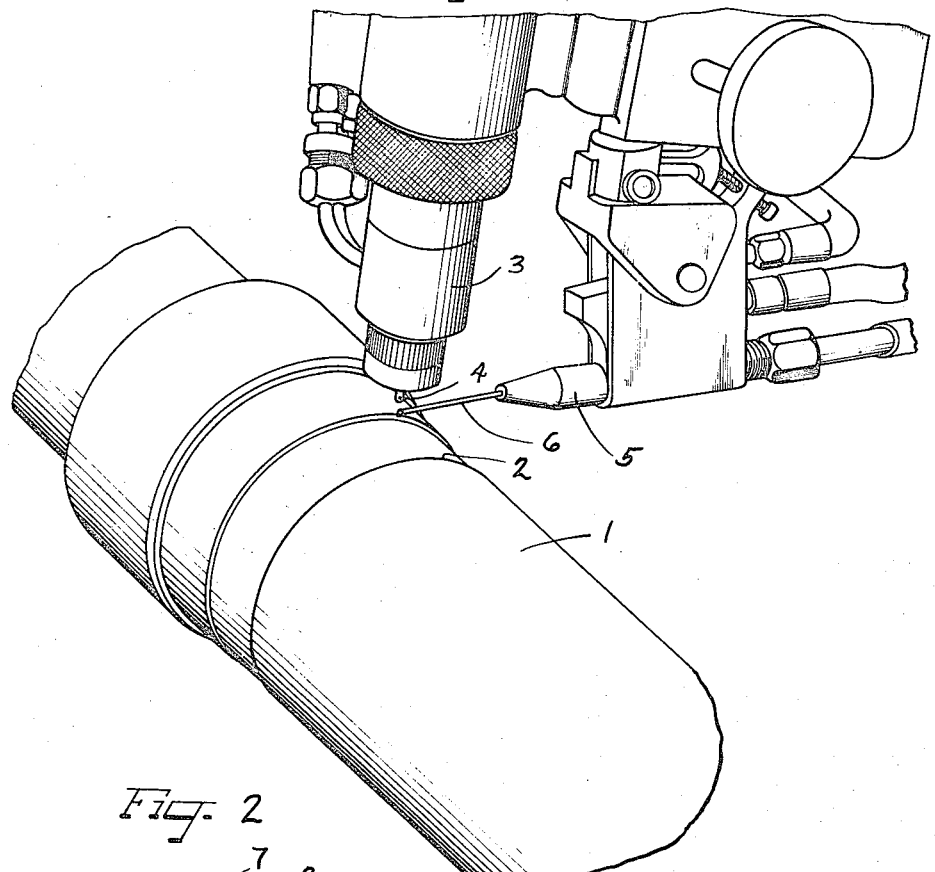

July 1, 1958  D. R. ANDREASSEN ET AL  2,841,688
METHOD OF APPLYING A COPPER BAND TO A METALLIC SURFACE
Filed Oct. 25, 1955

Inventors
DONALD R. ANDREASSEN
IRVING  HERMAN by  Attys.

United States Patent Office 2,841,688
Patented July 1, 1958

2,841,688

METHOD OF APPLYING A COPPER BAND TO A METALLIC SURFACE

Donald R. Andreassen, Waterloo, and Irving Herman, Cedar Falls, Iowa, assignors to Chamberlain Corporation, Waterloo, Iowa, a corporation of Iowa Application October 25, 1955, Serial No. 542,622

7 Claims. (Cl. 219—76)

This invention relates to improvements in a method of applying a copper band to a metallic surface, and more particularly to a method of welding a copper band or stripe to a metallic surface, the invention being highly desirable for the welding of a copper band to an artillery shell for rifle grooving of the band, since the thin shell wall cannot be so grooved, although the invention will have numerous other purposes and applications as will be apparent to one skilled in the art.

In the past, copper bands or stripes had been applied to metallic surfaces by the method of utilizing a copper wire as an electrode and feeding another copper wire into the arc between the electrode and work to effect a melting of the wires, and the subsequent welding of the molten copper to the work surface. A suitable gas may be utilized to aid in effecting the weld if so desired. However, in accomplishing such a weld heretofore it has been deemed essential to utilize deoxidized copper for both the wires, and deoxidized copper is materially more expensive than standard or high conductivity electrical copper wire. Thus, heretofore in effecting a weld of this character objectionable expense has been involved by way of the use of a deoxidized copper wire as both the hot and cold electrodes during the welding operation.

With that in mind, it is an important object of the instant invention to provide a method of applying a copper band or stripe to a metallic surface by means of the use of copper wires one of which is an electrode, which method effects a saving of at least 25% in copper cost over the methods heretofore employed.

Another object of the instant invention is the provision of a method of applying a copper band or stripe to a metallic surface, which consists in utilizing a pair of copper wires one of which is an electrode during a welding process, one of those wires being a standard or a high conductivity electrical copper wire, while the other wire may be deoxidized copper.

Another object of the invention is the provision of a method of welding a copper stripe or band to a metallic surface by way of utilizing a pair of copper wires continuously fed to the welding location, energizing one of the copper wires as an electrode to effect a melting of the copper and a welding of the copper to the surface, one of the wires being deoxidized copper, and the other a standard or a high conductivity electrical copper.

Still another object of the invention is the provision of a method of welding a copper band or stripe to a metallic surface by the use of copper wires continuously fed to the welding location, and wherein the hot electrode is a deoxidized copper wire, while the cold wire is electrically neutral and is a standard or a high conductivity electrical copper wire.

While some of the more salient features, characteristics and advantages of the instant invention have been above pointed out, others will become apparent from the following disclosures, taken in conjunction with the accompanying drawing, in which—

Figure 2:
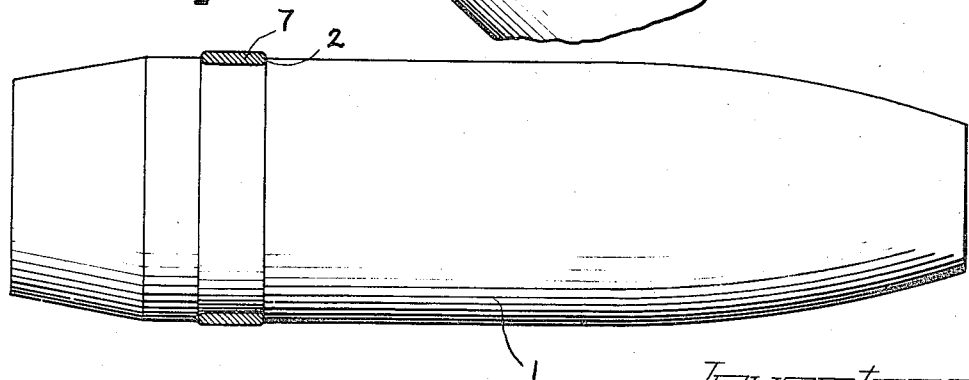

Figure 1 is a fragmentary diagrammatic elevational view illustrating the manner of performing the instant method; and Figure 2 is a side elevational view, with parts in section, illustrating a resultant copper band applied to a shell casing, by way of example.

As shown on the drawings:

One of the prime advantages of the instant invention is the saving in cost in the operation of applying a copper band or stripe to a metallic surface. Heretofore, where the copper wires were continuously fed toward welding position, one being energized as an electrode and the other fed into the arc to melt the copper and weld the melted copper to the metallic surface, deoxidized copper wires were utilized. Deoxidized copper wire costs in the neighborhood of two and a half times the cost of standard electrical copper wire. High conductivity copper wire costs very little more than standard. Applicants have discovered that while the use of standard or high conductivity electrical copper wire for each of the wires results in an unsatisfactory weld, a standard or a high conductivity electrical copper wire may be used as one of the wires and an entirely satisfactory weld produced. Thus, there is effected a saving approximating 30% of the total copper cost in providing copper stripes or bands on metallic surfaces by way of the instant process. Such a saving is obviously a most material and advantageous one, particularly since the copper cost is the maximum item of expense in processes of this character.

While the instant invention is adaptable for the application of a copper band or stripe to substantially any desired metallic surface and for various purposes, we have selected by way of illustration the application of a copper band to an artillery shell, which band is ultimately grooved to fit the rifling in the barrel of the gun, since it is substantially impossible to groove the relatively thin wall of the shell itself.

To illustrate the instant method, in Fig. 1 we have shown an artillery shell 1 which is of somewhat reduced diameter rearwardly of the annular shoulder 2, and it is just to the rear of this shoulder that a copper band is to be applied to the shell. The shell 1 is mounted for rotation in any suitable manner, such as by positioning upon a lathe-like piece of apparatus, and the shell is preferably maintained rotating during the welding of the band around it.

Suitable welding equipment is diagrammatically illustrated embodying an electrode holder 3 through which a copper wire 4 which functions as the actual electrode or hot wire is continuously fed during the operation, since the copper wire itself provides part of the copper for the band of the shell 1. The welding arc will occur between the hot wire and the workpiece or shell 1. Another holder 5 is provided to guide a second copper wire 6 fed therethrough into the welding arc to be melted thereby along with the first wire to provide copper for the ultimate band. It will be understood, of course, that suitable electrical power may be applied in a well known manner, and the wires continuously fed toward welding location by any suitable apparatus.

In the process of providing a copper band around the shell 1, the wires are continuously fed forward toward welding position, and the welding arc melts the copper of the wires, and this copper is welded directly to the surface of the shell 1 as the shell rotates beneath the wire ends. Inert gas shielding is preferably provided in a known manner. With this procedure, a band of any desired thickness and any desired width may be provided upon the shell 1. It will be understood, that the shell may be moved longitudinally as well as rotatably beneath the point of weld so that the width of the band may readily be determined. In Fig. 2 we have illustrated a completed band 7 welded to the shell 1 behind the annular shoulder 2, by way of the instant process.

In the illustrated instance, the wire 4 constitutes the hot electrode and is of deoxidized copper while the wire 6 constitutes the cold wire and is of standard or high conductivity electrical copper. This arrangement where the deoxidized copper wire functions as the hot electrode provides a definite and highly satisfactory welded copper band, suitable for military purposes.

On the other hand, it has also been determined that where the wire 6 is made of deoxidized copper, and the hot electrode 4 of standard or high conductivity electrical copper, a weld results that is satisfactory for many purposes, although it may not be satisfactory or sufficiently fine to pass military inspection. The other purposes for which a weld would be satisfactory in the event the wire 4 or the hot electrode were made of standard or high conductivity electrical copper would be for banding various forms of metallic surfaces wherein the accuracy necessary for military purposes is not essential. For example, it might be desirable to place a copper band around the circumferential margin of a cooking vessel or the like, or it might be desirable to place a copper spot in the center of the bottom of a cooking vessel; or on the other hand it might be desirable to place a copper stripe along the wall of a metallic surface for conductive purposes of signalling, denoting filling of a tank in association with the float valve contact, etc. In fact, there are many and various purposes for which a weld would be satisfactory even though the hot electrode be made of standard or high conductivity electrical copper rather than deoxidized copper.

Where the term "standard" electrical wire is used in the appended claims, this term is to be construed as including high conductivity electrical copper wire as well as other substantially equivalently economical copper wire.

From the foregoing, it is apparent that we have provided a novel method of applying a copper band or stripe to a metallic surface by way of a method that is far more economical in its performance than methods for accomplishing the same function heretofore known. The reduction in copper cost, which is the major cost in such an operation, is considerable, and yet the method is not otherwise any more expensive to employ than methods of the same character heretofore known and may be practiced with equal facility.

It will be understood that modifications and variations may be effected without departing from the scope of the novel concepts of the present invention.

We claim as our invention:

1. The method of applying a seamless copper band to a cylindrical element, including the steps of mounting a cylindrical element for rotation, separately feeding a pair of copper wires at an angle towards each other adjacent the cylinder, energizing one wire as the hot electrode and feeding the other wire into the welding arc to melt the wires and weld the copper to the cylinder while rotating the cylinder, one of said wires being deoxidized copper and the other standard electrical wire.

2. The method of applying a seamless copper band to a cylindrical element, including the steps of mounting a cylindrical element for rotation, feeding a deoxidized copper wire toward a point on said element, feeding a standard electrical copper wire at an angle toward the first wire, energizing one of said wires as a hot electrode, and guiding the other wire into the arc between the hot electrode and the element while rotating the element.

3. The method of applying a seamless copper band to a cylindrical element, including the steps of mounting a cylindrical element for rotation, feeding a deoxidized copper wire toward a point of said element, feeding a standard electrical copper wire at an angle toward the first wire, energizing the deoxidized wire as the hot electrode, and guiding the other wire into the arc between the hot electrode and the element while rotating the element.

4. The method of welding a copper band to a cylindrical member, including the steps of feeding a deoxidized copper wire and a standard electrical copper wire at an angle toward each other and toward the intended welding location on said member, utilizing one of said wires as the hot electrode, and guiding the other wire into the arc between the hot electrode and said member while rotating the member.

5. The method of welding a copper band to a cylindrical member, including the steps of utilizing a deoxidized copper wire as a hot electrode and feeding a standard electrical copper wire into the arc between the hot electrode and said member to melt the wires and weld the molten copper to the member while rotating the member.

6. The method of welding a copper stripe on a metallic surface, including the steps of continuously feeding a deoxidized copper wire and a standard electrical copper wire at an angle to each other and toward a selected welding location on said surface, energizing one of said wires as a hot electrode, and guiding the other wire into the arc between the energized wire and said surface while moving said surface to distribute the melted copper and define the stripe.

7. The method of welding a copper stripe on a metallic surface, including the steps of continuously feeding a deoxidized copper wire and a standard electrical copper wire at an angle to each other and toward a selected welding location on said surface, energizing the deoxidized copper wire as a hot electrode, and guiding the other wire into the arc between the energized wire and said surface while moving said surface to distribute the melted copper and define the stripe.

References Cited in the file of this patent

UNITED STATES PATENTS

| | | |
|---|---|---|
| 2,649,528 | Koenig et al. | Aug. 18, 1953 |
| 2,681,970 | Koopman | June 22, 1954 |
| 2,709,213 | Gibson | May 24, 1955 |
| 2,709,295 | Chyle | May 31, 1955 |